United States Patent

[11] 3,596,282

[72] Inventor Jerry A. Stegenga
    Coral Gables, Fla.
[21] Appl. No. 706,906
[22] Filed Feb. 20, 1968
[45] Patented July 27, 1971
[73] Assignee Milgo Electronic Corporation
    Miami, Fla.

[54] MARKING MECHANISM INCLUDING A THIN-EDGED WHEEL STYLUS FOR ELECTROSENSITIVE RECORDER
5 Claims, 5 Drawing Figs.

[52] U.S. Cl.................................................. 346/74 ES,
    346/23, 346/74 E, 346/139 C
[51] Int. Cl......................................................G01d 15/06,
    G01d 9/10
[50] Field of Search.......................................... 346/23, 74
    ES, 74 E, 74 S, 74 SB, 74 SC, 114, 139 C, 140;
    250/49.5

[56] References Cited
UNITED STATES PATENTS

| | | | |
|---|---|---|---|
| 1,827,178 | 10/1931 | Tonietti | 346/23 X |
| 2,952,204 | 9/1960 | Sherman | 346/74 X |
| 3,392,401 | 7/1968 | Lloyd | 346/23 |
| 3,414,723 | 12/1968 | Pleitt et al. | 346/23 X |
| 6,420 | 5/1849 | Morse | 346/74 |
| 2,205,450 | 6/1940 | Wise | 346/140 X |
| 3,311,919 | 3/1967 | Clair | 346/140 X |

*Primary Examiner*—Bernard Konick
*Assistant Examiner*—Gary M. Hoffman
*Attorney*—Beveridge & DeGrandi ABSTRACT: This invention provides a sturdy mechanism to replace a fine wire stylus for recording data points or a continuous line on a coated moving strip as it passes over a backing element, comprising a thin-edged wheel mounted for free rotation about an axis combined with a linear backing element over which the strip is transported. Advancement of the strip over a thin backing element rotates the wheel to provide a continuously changing point of contact on the wheel and is especially useful with electrosensitive papers and certain types of pressure-sensitive papers. A fine line comparable to the best fine wire stylus practice is achieved, and the wheel stylus has greatly increased rigidity, durability and service life.

PATENTED JUL 27 1971 3,596,282
FIG.1
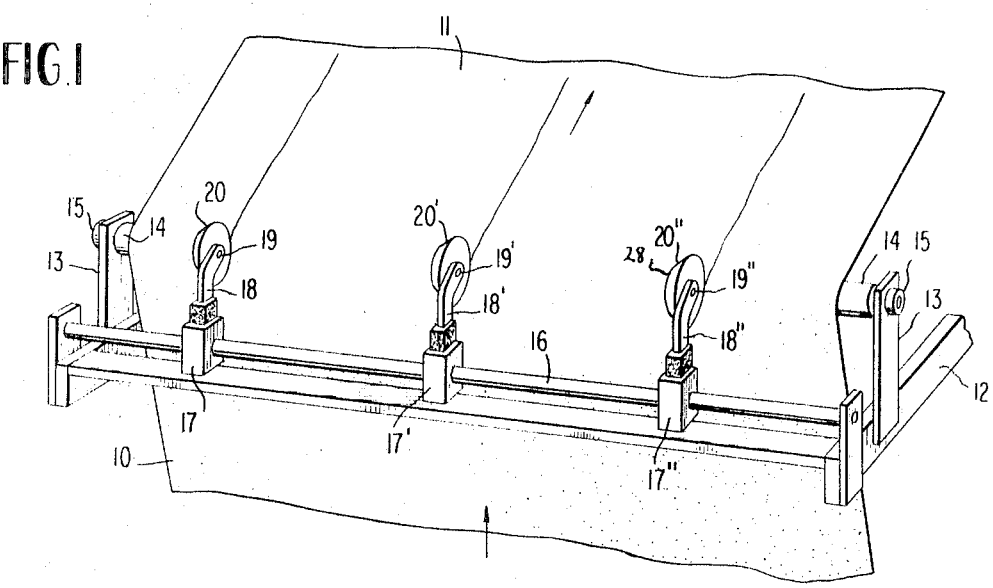
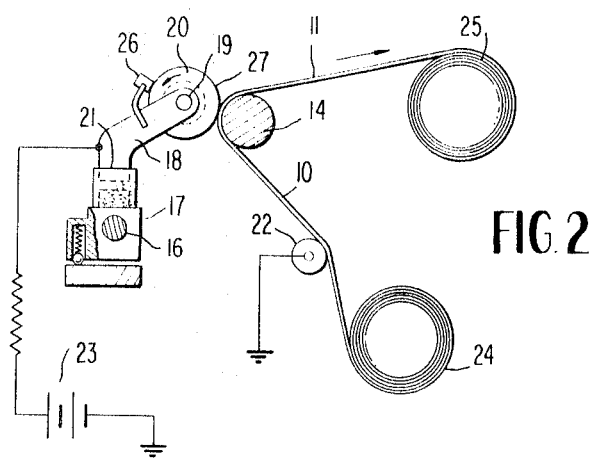
FIG.2
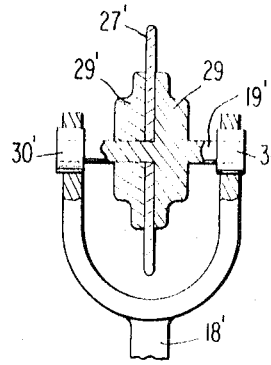
FIG.2A
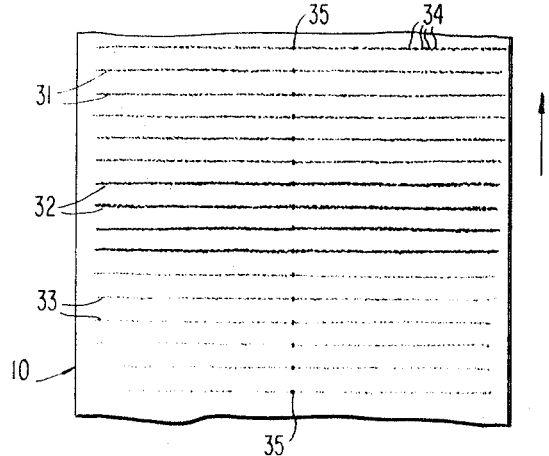
FIG.4
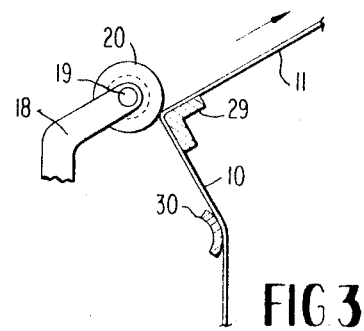
FIG.3
INVENTOR
JERRY A. STEGENGA
BY Browne, Schuyler & Beveridge
ATTORNEYS

MARKING MECHANISM INCLUDING A THIN-EDGED WHEEL STYLUS FOR ELECTROSENSITIVE RECORDER

Industrial process monitoring, statistical or accounting data accumulation, and recording of the output of computerized operations of many kinds results in the need for two-coordinate representation of the output. For numerous purposes it is desirable that a record sheet pass a recording head continuously at a given rate during recording intervals to represent time along the record sheet while the data output is represented as a rectilinear lateral displacement of a writing head over the width of the record sheet or over a limited width when a number of heads are operating in respective channels along the record sheet.

Many previous recorders have been confined to data representation as deflections of a pivoted arm to produce a data representation which is of a special arcuate coordinate from an assumed zero line on the record sheet rather than rectilinear. A rectilinear deflection is also known, an example of which is shown in U.S. Pat. No. 3,145,070. Previous practice in recording on electrosensitive strips has generally fed recording current via a fine wire stylus of diameter usually between 0.003 and 0.010 inch in continuous contact with the record sheet. In pressure-sensitive recording it has been necessary to apply sufficient force to mark a pressure-sensitive paper or to transfer a marking material from an inked sheet to the record paper. When an adequate pressure is applied the stylus wears rapidly, collects encumbering dirt and vibrates excessively, and is easily bent to cause erroneous recording. These difficulties are reduced by use of electrosensitive papers where light pressure suffices, but are not eliminated. Such recorders pass current to the record sheet at the point of contact of the stylus, a grounding bar in contact with sheet providing an electrical return, either at the front of the record sheet or at the back thereof, depending upon the type of paper employed.

Under previous practice a fine wire stylus of sufficient fineness to produce a high resolution graphical line is subject to vibration, to bending displacement, and to rapid wear. Where vibration is experienced a fine wire stylus may actually produce a broader line than a larger stylus because of the vibratory motion of the stylus point as the paper moves past the stylus and over a backing element. Impact pressure or accidental injury in handling frequently causes the stylus point to be displaced, thereby causing a zero error. Additional difficulties occur in that a fine wire wears rapidly and requires frequent replacement, and in that a fine wire stylus tends to collect portions of the surface coating of the paper employed as a recording medium. Such a stylus is not readily cleaned by any known automatically applied wiping action.

This invention has particular application to electrosensitive papers, but has utility marking pressure-sensitive papers as it deals with the problems of rapid stylus wearing, and vibration or bending of stylus under adverse conditions ordinarily encountered.

It is accordingly an object of the present invention to provide a stylus having increased strength and durability without an increase in area of effective contact with the recording paper.

Another object of the invention is to provide a long-lasting rugged stylus having a continuously replaced clear surface in contact with the recording strip.

A further object of the invention is to provide a stylus in the form of a rotary wheel forming a fine point of contact area when pressed against a recording strip passing over a thin backing member.

A still further object of the invention is to provide a rotary wheel stylus adapted for applying increased pressure upon a recording medium without encountering vibration or bending such as to blur or displace the trace formed.

These and other objects of the invention will be apparent in connection with the following description in which:

FIG. 1 is a perspective view of a recorder marking mechanism according to this invention;

FIG. 2 is an end view partially in section of the apparatus of FIG. 1;

FIG. 2A is a front elevation of a stylus wheel as formed of thin sheet fragile material;

FIG. 3 is a partial end view as in FIG. 2 showing an alternative form of backing bar, and FIG. 4 is a detail diagram showing a typical recording made by a marking mechanism according to this invention.

According to this invention a very fine line trace can be produced particularly on electrosensitive papers without danger of stylus flexing or displacement as the record sheet passes in contact with the stylus as experienced in fine wire stylus markers, while preventing damage to the stylus during handling. This objective is achieved mainly by the use of a rigid stylus wheel which may be of diameter such as three-eighths to three-fourths inch, particularly about one-half inch. Such a rotary disc stylus may be mounted upon a fixed axle which is in turn supported by a suitable arm attached to a driving means for moving the stylus laterally along the backing bar and in contact with the front face of the record sheet to mark ordinate values when sheet movement registers abscissa values, or time values when moving uniformly.

The marking system is shown in FIG. 1 in which a record sheet is shown at 10 as a plain white-faced sheet having a portion 11 drawn away from the recording region. A suitable support or base member 12 is attached to the recorder housing in any desired manner, not shown, and carries thereon supports 13 from which a backing bar or roll 14 is supported in the marking position perpendicular to the direction of travel of sheet 10, preferably by bearings 15 when the backing element is a roll as at 14.

Operation of the stylus to record ordinates utilizes a transverse element 16 serving as a track on which a number of stylus members according to the number of channels to be recorded side by side on the record are disposed for lateral movement. Slide or runner members 17, 17', and 17" attach to track 16 in a manner to be translated laterally as by a cord drive (by drive means not shown) within limits of travel according to the width of the recording channel for the particular stylus. Arm 18 is supported on runner 17 and carries an axle 19 for movement parallel to the backing bar or roll 14. Stylus wheel 20 is mounted on axle 19 for rotation whenever the record sheet 10 passes over roll 14 during a recording operation. The axis of rotation is generally perpendicular to the record sheet movement, but may be at an angle to cause greater rotation for one direction of movement on track 16 than for the other direction, for example, a return to a zero point. Members 18', 19', 20', 18", 19" and 20" correspond to members 18, 19 and 20 for recording in their respective lateral positions data to be represented in the corresponding channels.

In FIG. 2 is illustrated in more detail a marking mechanism according to this invention in which an end view of the marking mechanism shown in FIG. 1 is illustrated. Runner 17 supports arm 18 which carries axle 19 and stylus wheel 20 in contact with record sheet 10 as it passes over roll 14 and is supplied with a suitable voltage for effecting a recording on the selected electrosensitive paper. Arm 18 contains an electrical insulating portion 21 in order that arm 18 may be held at a suitable potential. Grounding bar or roll 22 is disposed on the front face of record sheet 10 when the selected electrosensitive paper is of the capacitor rather than resistive fed-through type.

Papers for this purpose are well known in the art. Permanent black markings are made in accordance with electrical potential supplied from an AC source or DC such as battery 23, preferably via a current limiting resistor to prevent excessive current flow. An electrical discharge occurs between the conductive stylus 20 and a conductive layer beneath the front face of the sheet 10, the return path being by way of grounding bar 22 to the potential source 23. A suitable supply roll 24 and pickup reel 25 may be driven continuously by means not shown at a time base rate.

While the invention is described in connection with a continuously moving record sheet on which a continuous trace would be marked as the wheel 20 rotates with the motion of the record sheet it is also contemplated that such a record sheet may be intermittently driven and marked, or the recording may be arranged transversely of the record sheet as illustrated in FIG. 4, such an arrangement being suitable for facsimile work wherein the electrical writing current varies the intensity of the marking. In such a case axle 19 is disposed at an angle to the transverse direction to thus provide a rotating force for the stylus wheel as it is moved laterally on sheet 10.

Any type of fine stylus used in contact with the moving paper is prone to pick up an accumulation of line or dirt of various kinds so as to produce spurious marking of the record sheet, a broadening of the line, or a failure to mark, according to the severity of the dirt accumulation. According to this invention a rotary stylus may be readily cleaned just prior to contact with the record sheet as by a sponge 26, which may be in the form of a brush or pad and may be supplied with suitable means restraining accumulated dirt so that it does not move with the rotating stylus into contact with the record sheet.

Stylus wheel 20 may have a thin rim 27 in contact with the record sheet by virtue of beveled face 28, arranged on either or both sides or rim 27. Beveled face 28 may be modified or omitted when wheel 20 is a thin disc.

FIG. 2A shows an alternative form of marking disc in which a hard and wear-resistant material such as tungsten or molybdenum provides the marking edge or rim 27' being formed from thin sheet by a stamping or punching operation. Such materials provide superior wear but are far too brittle to be machined or drawn into wire form. Arm 18' may be bifurcated rather than of simpler form as in FIG. 1 and supports the stylus on a shaft 19' having collars 29, 29', one of which may be fixed to shaft 19' and the other a press fit to clamp the disc concentrically about the shaft between precision bearings 30, 30'. By this construction a stylus of frangible material may be constructed of a nonmachinable and nonductile substance, generally of thickness between 0.002 to 0.006, preferably about 0.003 inch. Thus finer resolution is obtained than by use of a wire stylus with greatly enhanced durability and the improved stylus is produced at small expense.

It will be appreciated that a backing bar 29 as in FIG. 3 may substitute for roll 14 and a grounding bar 30 in contact with front face of sheet 10 may be used in lieu of roll 22 for grounding connection to power supply 23. Bar 29 may have a small radius of curvature at the active edge such that backing contact is along the apex of the angle formed between two faces of bar 29. It will be noted that when wheel 20 has a beveled or thin rim of diameter about one-half inch and the radius of curvature of the backing element 14 or 29 is of the order of one-fourth inch or less a light pressure to bias wheel 20 against sheet 10 effects contact over only a small region of oval or circular shape. When the pressure is about 3 to 10 grams and the paper surface relatively hard, it will be apparent that the contact area will be very small whether marking is by pressure or by electrical discharge. A stylus as illustrated and described is effective for drawing lines as close together as 200 lines per inch or better.

Microscopic examination of a typical record shows a trace comprising many small dots rather than a continuous line on the record sheet, as shown in FIG. 4. When the discharge is sufficiently intense an enlarged or dark dot is produced. The lateral dimension of the trace formed is of course a function of the radius of curvature of the rim or edge 27 as it contacts the curved record face, the length of a discharge area being determined by closeness of tangent approach to the sheet according to the combined radii of the wheel and backing element.

FIG. 4 illustrates a record sheet 10 in which successive recording lines are made across the width of the sheet in three groups of recordings. At 31 is shown a group of recorded lines made at moderate intensity of electrical signal, a second group of lines 32 showing a more intense signal recording and a further group at 33 at a lesser intensity.

It will be noted that traces 31 consist of many discrete dots 34 of small size arranged in a pattern within an area of close approach of stylus to sheet. It will be appreciated that recording by electrical current depends upon the fortuitous position of the breakdown across an insulating white surface which covers the face of the record sheet. Thus while the area of close contact between stylus 20 and the conducting layer of the record sheet is quite small a trace may consist of many discrete markings in each minute element of the trace. Similar considerations are applicable for discharge through the sheet to a conductive backing element which completes the circuit. A more intense signal appears to cause overlapping of these minute points at which current enters the conductor beneath the surface to produce a darker trace as in halftone printing. A still more intense signal is represented by dots 35, intentionally enhanced as illustrated to provide an effective zero line along the length of the record. Discrete dots distributed along both sides of a centerline of the trace may result from an electrical discharge comprising discontinuous breakthroughs of the insulation somewhat similar to sparking between spark terminals. The resulting trace has a resolution determined by the closeness of approach between wheel 20 and element 14 which combine in curvature to limit discharge to an area of a few thousandths of an inch in diameter, maximum intensity being still further limited to the points of tangency.

It will accordingly be evident that a marking mechanism according to the present invention is capable of marking a trace equal or better in resolution to the best wire stylus practice while at the same time providing a rugged stylus of very great durability compared to a wire stylus. The circumference of stylus wheel 20 may be 1 to 2 inches and may have a width of effective marking which is less than the width of the fine wire stylus. Its ability to stand wear however is many thousands of times greater than the fine wire stylus as may be calculated according to the amount of material which would have to be worn away to cause sufficient shortening of the stylus to require replacement or adjustment. An appropriate bearing on axle 19 for wheel 20 may be lubricated so that little or no wear occurs at that portion of the rotary stylus. Arm 18 may be made as rugged as desired so that it has little tendency to be bent or damaged. Accidental stylus damage is unlikely in view of the rugged structure of the stylus, and the tendency of a fine wire stylus to vibrate and broaden or blur the trace is avoided. When used for pressure recording a rotary stylus, as combined with a backing element such as 14 or 29, can also produce a record trace of as good or better quality as the fine wire stylus, but with the same improved durability as with electrosensitive papers. Particularly in recording papers which have a relatively loose surface material which comes off during a recording, a fine wire accumulates this material in a manner to cause deterioration of the resulting trace. By the present invention a stylus is provided which has a continuously renewed edge portion in contact with the record. Since it is a rotary disc or wheel it permits the use of a wiping element such as sponge or pad 26 or, equivalently, a brush of appropriate design.

While the invention has been described in connection with a particular embodiment found to be effective in providing high resolution data recording it will be appreciated that the invention may be practiced otherwise and as shown and described, and the invention is not intended to be limited to a particular apparatus as shown, but only in accordance with the appended claims.

What I claim is:

1. In a recording device supplied with a moving record sheet and a tracked marking device adjustable laterally along said sheet, an improved marking mechanism, comprising
   a linear backing member of small radius of curvature supporting said sheet in a line adjacent the path of desired marking,
   arm means supported for lateral translation adjacent said path,
   shaft means mounted on said arm means for rotation about an axis substantially nonparallel to said path, disc means concentrically mounted on said shaft means, in contact with said sheet, wherein marking current flowing from said disc to said sheet passes through successively different disc portions as the record sheet advances.

2. A stylus according to claim 1, said disc having a diameter in a plane at a substantial angle to a line parallel to the backing element, whereby contact between said disc and said sheet causes rotation of said disc with lateral movement or as the sheet is advanced.

3. A stylus according to claim 1, said disc being of a wear-resistant metal such as tungsten, and its alloys.

4. A stylus according to claim 1, said disc being of frangible material in the form of a circular sheet of uniform thickness concentrically clamped on a bearinged shaft.

5. A stylus according to claim 1, wherein said disc is of a diameter substantially between one-quarter and three-quarter inch and said backing element has a radius of curvature not substantially greater than that of said disc for limiting the area of contact pressure therebetween to produce a fine resolution recording.